Aug. 13, 1946.   F. STONER   2,405,769
CONTROLLER
Filed May 27, 1944
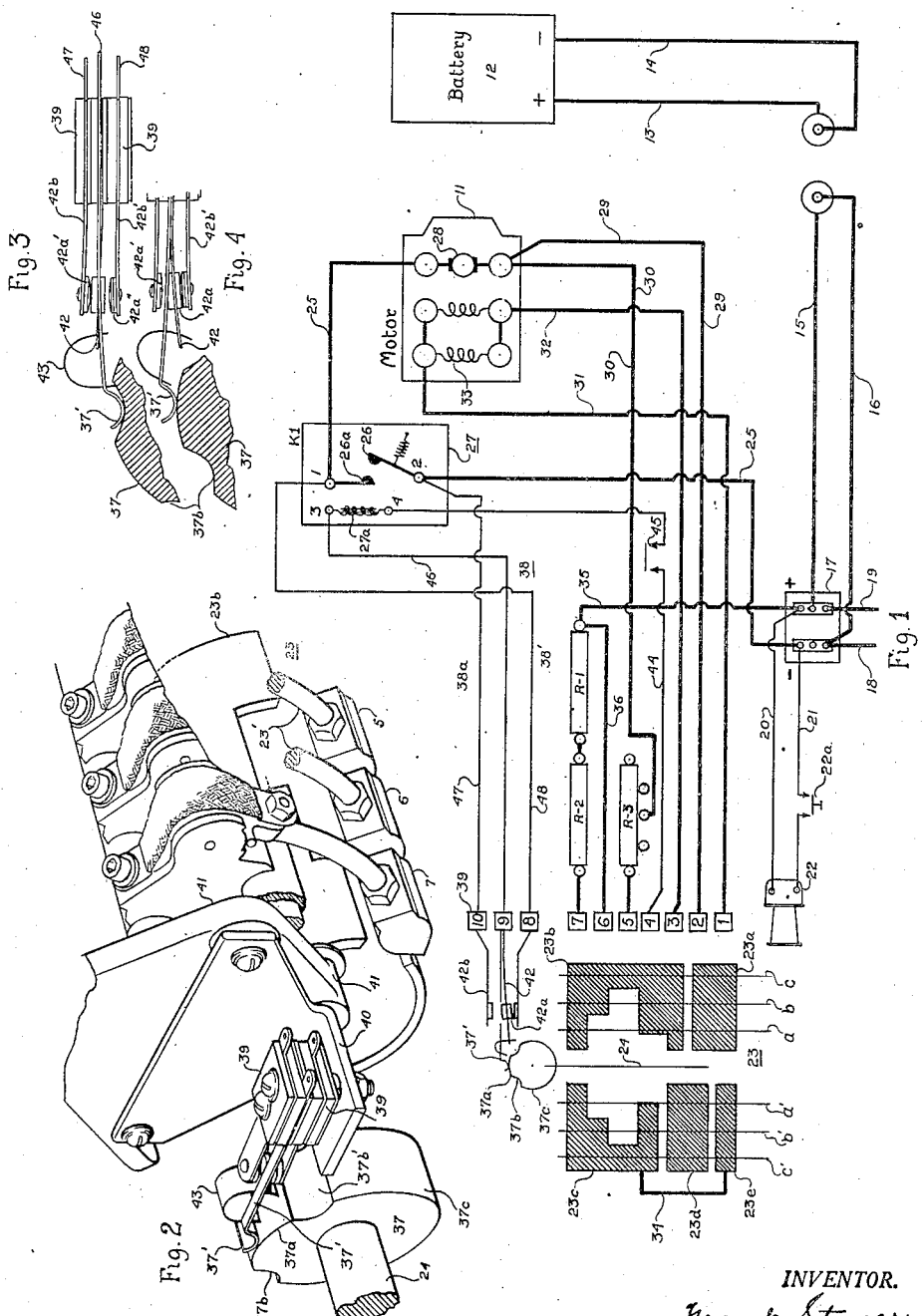
INVENTOR.
Frank Stoner,
BY
Geo. B. Pitts Patented Aug. 13, 1946

2,405,769

UNITED STATES PATENT OFFICE 2,405,769

CONTROLLER

Frank Stoner, Lakewood, Ohio, assignor to The Baker-Raulang Company, Cleveland, Ohio, a corporation of Ohio Application May 27, 1944, Serial No. 537,653

3 Claims. (Cl. 172—179)

This invention relates to a controller and the circuit controlled thereby for a vehicle, more particularly circuit controlling means applicable to a vehicle, such as a tractor or one employed for handling loads where operating conditions make it necessary to (a) change the speed of the vehicle during vehicle travel and (b) make quick reversal of truck travel. Vehicles of this type are commonly referred to as industrial tractors and/or trucks. The trucks are employed for loading and unloading operations, stacking and de-stacking operations and transfer of parts and products from one location to another location. In most instances, of which I have knowledge, for economical reasons, the operative for the tractor or truck is encouraged to carry out these operations and effect truck travel from one location to another as rapidly as possible. In tractor or truck travel the aisles or lanes may be along a circuitous route, due to turns, positioning of machines and piled-up materials, so that it becomes customary to speed up the tractor or truck in straight-away sections of the route and quickly slow down at turns. In load pick-up and discharge operations the truck is often driven forwardly and rearwardly with short quick impulses of movement. Under these various operating conditions the operative attempts to slow up or stop the traction motor of the tractor or truck by reversing the current thereto, instead of applying the vehicle brake, so that damage to the motor and the electrical connections, as well as undue strain on parts of the truck, resulted.

One object of the invention is to provide in a motor driven vehicle an improved electric circuit for the motor and a controller therefor wherein provision is made to break the motor circuit independently of the controller upon return movement of the latter from any operated position thereof, thereby making it necessary to apply the vehicle brake in reducing the truck speed and/or stopping the truck.

Another object of the invention is to provide an improved controlling means for operating an electric motor, wherein operation of the motor at high speed is dependent upon the initial operation of the controller to and dwell thereof at a predetermined position.

Another object of the invention is to provide in an electric motor circuit having a contactor, an improved controlling means for the contactor consisting of a closing circuit and a holding circuit connected to the motor circuit at opposite sides of the contactor and arranged to be alternately closed by and in co-ordinated relation to the movement of the controller from neutral position to first speed position and then to a higher speed position thereof, respectively, the closing of the holding circuit by movement of the controller to the higher speed position being dependent on a "dwell" thereof at the first speed position.

Another object of the invention is to provide an improved controlling means for the circuit of an electric motor arranged to prevent reversal of current to the motor when the latter is running in either direction only by first moving the controller to neutral position for operating the motor in the opposite direction.

Another object of the invention is to provide in an electric motor circuit having a contactor, an improved controlling means for the contactor consisting of a closing circuit and a holding circuit connected to the motor circuit at opposite sides of the contactor and a cam operated by the shaft of the controller and arranged to substantially simultaneously close the closing circuit and open the holding circuit, and vice versa, whereby the operation of the contactor is facilitated.

Another object of the invention is to provide an improved controlling means for the circuit of a variable speed electric motor wherein (a) a minimum amount of metal forming the contact portions or conductors of the controller is required to complete the circuit to the motor for each speed thereof and (b) the circuit for controlling the motor circuit is simplified to insure quick action either in initial closing of the motor circuit or subsequent breaking thereof.

Other objects of the invention will be apparent to those skilled in the art to which my invention relates from the following description taken in connection with the accompanying drawing, wherein Fig. 1 is a diagram showing a controller, an electric motor, a circuit for the motor and a control means incorporated therewith embodying my invention.

Fig. 2 is a fragmentary perspective view of the controller.

Figs. 3 and 4 are detail views of parts shown in Fig. 2.

In the drawing, 11 indicates an electric motor. 12 indicates an electrical power supply, preferably consisting of a suitable storage battery having leads 13, 14, which through a suitable receptacle and plug therefor are connected by leads 15, 16, respectively, to bus bars on a terminal block 17. Leads 18, 19, connect the bus bars with any other motor (not shown) with which the vehicle may be equipped. Leads 20, 21, connect the bus bars with a horn 22, which is controlled by a push button 22a.

23 indicates as an entirety a controller fixed to a shaft 24 for rotation in one direction to close the motor circuit, to thereby propel the vehicle forwardly and in the opposite direction to reverse the circuit connection with the motor, whereby the vehicle is propelled rearwardly, the controller and circuits being arranged to provide three speeds in each direction, but my invention is applicable where a lesser or greater number of speeds may be provided. The shaft 24 may be operated through suitable gearing actuated by a lever or wheel (the gearing and lever or wheel not shown). The controller is provided with (a) conductors 23a, 23b, operable to close the motor circuit when the motor is driven to propel the vehicle forwardly and (b) conductors 23c, 23d, 23e, operable to close the motor circuit when the motor is driven to propel the vehicle rearwardly, these conductors being arranged to engage contacts 1, 2, 3, 4, 5, 6, 7, in the manner later set forth.

The motor circuit consists of the following: lead 25 connecting one bus bar through the movable and stationary contacts 26, 26a, respectively, on the support for the contactor indicated as an entirety at 27, to the armature (indicated at 28) of the motor 11, the contact 26 being normally disengaged from the contact 26a; leads 29, 30, from the motor armature to contacts 2, 5, respectively (the latter lead including an adjustable resistor R—3); leads 31, 32, connecting field coils 33 of the motor 11 with contacts 1, 3, respectively, it being noted that when contacts 1 and 3 are connected through controller conductors 23a, 23b, the motor 11 is driven to propel the vehicle forwardly and when contacts 1 and 3 are connected through controller conductors 23c, 23e, and a lead 34 therebetween, the motor 11 is driven to propel the vehicle rearwardly; lead 35 connecting the other bus bar to contact 7 and having resistors R—1 and R—2 connected in series therein; and lead 36 connecting contact 6 to the remote end of resistor R—1.

The pivoted contact 26 is preferably weighted so as to normally be out of engagement with the contact 26a, but a spring 26a' is provided to bias it to its normal position, the spring functioning to give the contact an initial impulse following de-energization of the coil 27a.

The contactor 27 consists of the switch contacts 26, 26a (already referred to), and an electro-magnet the coil 27a of which, when energized as later set forth, serves to move the movable contact into engagement with the contact 26a, to close the circuit through the lead 25.

37 indicates a cam (formed of suitable insulation material) fixed to the controller shaft 24 for controlling a circuit indicated as an entirety at 38. The cam 37 is provided with a mid-section 37a, with which the outer end of a resilient arm 37' engages when the controller is in "off" or neutral position, recesses 37b, 37b', at either side of the mid-section 37a and co-ordinated with the first speed position of the controller 23 when the latter is rotated in either direction and a section 37c on which the arm 37' rides during movement of the controller in either direction from the first speed position to and from the second and/or third speed positions back to the first speed position. The inner end of the arm 37' is rigidly supported between pads 39 formed of insulating material and supported on a bracket 40 fixed to the adjacent supporting element 41 for the controller 23. As shown in Fig. 2, the intermediate portion of the arm 37' is cut away to accommodate a resilient arm 42 carrying a contact 42a arranged to engage contacts 42a', 42a'' (see Figs. 3 and 4) as later set forth. A flipper 43 formed of resilient material connects the arms 37' and 42 together and normally tends to hold them in either of two positions; that is, (a) when the arm 37' rides from the mid-section 37a of cam 37 or section 37c into either recess 37b, 37b', the flipper 43 is contracted and effects movement of the arm 42 to the Fig. 3 position to cause engagement of the contact 42a with the contact 42a' and (b) when the arm 37' rides out of either recess onto either section 37a, 37c, the flipper 43 is contracted and forces the outer end portions of the arms 37', 42, apart, whereby the contact 42a engages a contact 42a'' (see Figs. 2 and 4). The contacts 42a', 42a'', are carried on the outer ends of resilient arms 42b, 42b', respectively, which arms and arm 42 are formed of suitable conducting material, for reasons later apparent. The inner ends of the arms 42, 42b and 42b' are insulated from each other and rigidly supported at their inner ends between the insulating pads 49. As will be noted in Figs. 3 and 4, the contacts 42a', 42a'', are so spaced that slight movement of the arm 42 effects disengagement of the contact 42a from either thereof and engagement with the other contact and that the spring tension of the flipper 43 is arranged to operate the arm 42 in either direction with a snap action, this arrangement and operation being advantageous to prevent de-energization of the coil 27a and breaking of the controlling circuit during movement of the contact 42a from its engagement with contact 42a' into engagement with contact 42a'' due to operation of the controller in either direction from first speed position to second speed position.

The controlling circuit 38 consists of a closing circuit 38a and a holding circuit 38'. The closing circuit is traced as follows: lead 44 connecting contact 4 through a manually operated switch 45 to one end of the coil 27a; lead 46 connecting the opposite end of the coil 27a to the arm 42; contacts 42a, 42a'; arm 42b; lead 47 connecting arm 42b with that section of the lead 25 which is connected to the movable contact 26; leads 16, 14 to battery 12; leads 13, 15, and lead 35 to contact 7.

The holding circuit 38' is traced as follows: lead 44 connecting contact 4 through the switch 45 to one end of the coil 27a; lead 46 connecting the opposite end of the coil 27a to the arm 42; contacts 42a, 42a''; arm 42b'; lead 48 connecting arm 42b' with that section of the lead 25 which is connected to the stationary contact 26a; contacts 26a, 26, and lead 25 to bus bar; leads 16, 14 to battery 12; leads 13, 15, and lead 35 to contact 7.

The switch 45 is controlled by a spring operated pedal positioned so as to be operated by the operative when standing in vehicle driving position. As this switch is connected in the controlling circuit, preferably the lead which is connected to one end of the coil 27a, it follows that upon release of this foot operated pedal, the controlling circuit is broken, so that operation of the controller in either direction will be ineffective.

Operation: With the brake released and pedal switch 45 closed, operation of the controller and cam 37 (clockwise as shown in Fig. 1) will effect closing of the circuits 38a, 38′, opening of the circuit 38a and engagement of the controller conductors 23a, 23b, with the contacts 1 to 7, inclusive, in the following manner: In this movement of the controller 23, certain of the contacts 1, 2, 3, 4, 5, 6 and 7 will be connected by the controller conductors 23a, 23b, in the first, second and third speed positions thereof indicated at a, b, c, respectively. In the reverse movement of the controller 23, certain of the contacts will be connected by the conductors 23c, 23d, 23e, in the first, second and third speed positions thereof indicated at a′, b′, c′, respectively. In the first speed position, the arm 37′ will ride into recess 37b, thereby effecting engagement of contact 42a with contact 42a′ to close the closing circuit 38a through leads 44, 47, and coil 27a. If the controller is held or dwells in this position long enough for the flux to build up in the coil 27a, the switch contact 26 will be moved into engagement with contact 26a to close the motor circuit, whereupon the controller may be moved to second and third speed positions; however, if the controller is moved to the second speed position without making the "dwell" above referred to, the motor circuit will remain open, since the coil 27a will not be energized and effect closing of the contactor switch 26—26a. If the "dwell" at the first speed position is made, operation of the controller to second speed position will, through engagement of conductor 23b with contact 6, connect lead 36 in the motor circuit to reduce the current through the field coils of the motor. In this operation of the controller, the arm 37′ will ride out of the recess 37b onto cam section 37c, thereby moving arm 42 to effect engagement of contact 42a thereon with contact 42a″ to close the holding circuit 38′ of the controlling circuit 38. As will be observed, the closing of the holding circuit maintains the coil 27a energized, so that the motor circuit through contactor switch 26—26a remains closed. If the controller 23 is moved to the third speed position, controller conductor 23b engages contact 5 to connect in the adjustable resistor R—3. As will be observed, in the movement of the controller 23 to third speed position and back to second speed position, the arm 37′ rides on the cam section 37c so that the holding circuit 38′ remains closed; but (a) if the controller 23 is moved back to the first speed position the arm 37′ rides into the recess 37b and effects engagement of contact 42a with contact 42a′ to break the holding circuit 38′ and close the closing circuit 38a, whereas movement of the controller 23 to neutral position opens the closing circuit through coil 27a to de-energize the latter and break the motor circuit through the contacts 26, 26a.

In the operation of the controller 23 to propel the vehicle rearwardly, it and cam 37 are rotated counterclockwise (as viewed in Fig. 1) to the first speed position a′. In such movement, conductors 23e, 23c, engage contacts 7, 3, respectively, and arm 37′ rides into the recess 37b′ to close the closing circuit 38a, which is then opened and the holding circuit 38′ closed if the controller is operated to second speed position b′ in the manner already described in operating the controller and cam clockwise, provided a "dwell" at the first speed position a′ takes place.

The coil 27a of the electro-magnet is balanced with respect to the power supply and resistance value of the resistors R—1, R—2 and R—3 and the motor, so that if the latter is running in one direction and the current supply thereto is reversed, the voltage drop will allow the movable contact 26 to disengage the contact 26a and thus open the motor circuit. Due to the fact that upon opening of the motor circuit the voltage immediately builds up in the battery, the movable contact will engage the contact 26a, following which engagement, due to drop in the voltage, the contact 26 will immediately disengage the contact 26a. Accordingly, this engagement and disengagement of the contacts will continue unless or until the operative applies the vehicle brake (thereby opening the controlling circuit through the switch 45) or returns the controller to neutral position.

By reason of the fact that in propelling the vehicle in either direction the controller must be held in its first speed position until the movable contact 26 is actuated it becomes impossible to drive the motor in the event the controller is operated to the second and/or third speed position without the dwell at the first speed position; and since, with the motor running in one direction, operation of the controller to reverse the current to the motor will be ineffective to supply current thereto, the operative is compelled to apply the vehicle brake to stop the motor whether the vehicle is to be brought to a stop or its direction of movement is to be reversed. The coil 27a is removable so that it may be changed where the power supply is increased or decreased to insure a balanced relation between it and the voltage in the motor circuit.

From the foregoing description it will be observed that the operation of the contactor 27 is controlled by the circuit 38, which is initially closed and maintained closed or opened by the cam 37, and not through any conductor or contact portion on the controller drum, thereby enabling me to provide a controller for the motor circuit having a minimum quantity of conductor material (for example, copper) necessary to complete the motor circuit for the different speed positions in either driving direction. Accordingly, as compared to the form of controller construction shown in my Letters Patent No. 2,140,564, dated December 20, 1938, a substantial saving in the quantity of metal on the controller results and permits a reduction in the number of contact carrying arms 23′ (see Fig. 2) and total length of the controller to facilitate the mounting of other operating equipment on the vehicle frame.

To those skilled in the art to which my invention relates many changes in construction and widely differing embodiments and applications of the invention will suggest themselves without departing from the spirit and scope thereof. My disclosures and the description herein are purely illustrative and are not intended to be in any sense limiting.

What I claim is:

1. In controlling means for a motor circuit, the combination with a motor, a controller and a source of current supply, of a circuit for the motor connected to said source of supply, and controlling means for said motor circuit comprising a closing circuit, a holding circuit and a contactor consisting of normally disengaged contacts in one lead of said motor circuit arranged to close and open it and an electro-magnet for operating one of said contacts in one direction to engage the other contact, the coil of said electro-magnet being in series with said closing and holding circuits and said closing circuit being connected to said lead at one side of said contactor and said holding circuit being connected to said lead at the other side of said contactor, a device synchronized with the movement of said controller and a switch operated by said device to close said closing circuit and open said holding circuit when the controller is moved to one operating position and open said closing circuit and close said holding circuit when said controller is moved to another operating position.

2. In controlling means for a motor circuit, the combination with a motor, a controller and a source of current supply, of a circuit for the motor connected to said source of supply, and controlling means for said motor circuit comprising a closing circuit, a holding circuit and a contactor consisting of stationary and movable contacts in one lead of said motor circuit arranged to close and open it and an electro-magnet the coil of which is in series with said closing and holding circuits, said closing circuit being connected to said movable contact and arranged to be closed when said controller is moved to its first speed position and said holding circuit being connected to said stationary contact and arranged to be closed when said controller is moved to a higher speed position, a switch arranged to close said closing circuit and open said holding circuit when the controller is moved to its first speed position and open said closing circuit and close said holding circuit when said controller is moved to a higher speed position and a cam fixed to the shaft for said controller for controlling the operation of said switch during movement of said controller.

3. In controlling means for a motor circuit, the combination with a motor, a controller and a source of current supply, of a circuit for the motor connected to said source of supply, and controlling means for said motor circuit comprising a closing circuit, a holding circuit and a contactor consisting of stationary and movable contacts in one lead of said motor circuit in normally disengaged relation and arranged to close and open it and an electro-magnet for operating said movable contact in one direction, said closing and holding circuits consisting of a lead in which the coil of said magnet is series connected, a lead for said closing circuit connected to said movable contact and a lead for said holding circuit connected to said stationary contact, a switch normally connected to said lead for said holding circuit and arranged to be connected to the lead for said closing circuit and a device fixed to the shaft for said controller operable to disengage said switch from the lead for said holding circuit and move it into engagement with the lead for said closing circuit upon movement of the controller to its first speed position and to disengage said switch from the lead for said closing circuit and move it into engagement with the lead for said holding circuit upon movement of said controller to a higher speed position, the operation of said electro-magnet to operate said movable contact being dependent on the dwell of the controller at the first speed position.

FRANK STONER.